May 12, 1925. 1,537,364
H. E. MASON
SPEED SIGNAL
Filed April 24, 1922 2 Sheets-Sheet 1
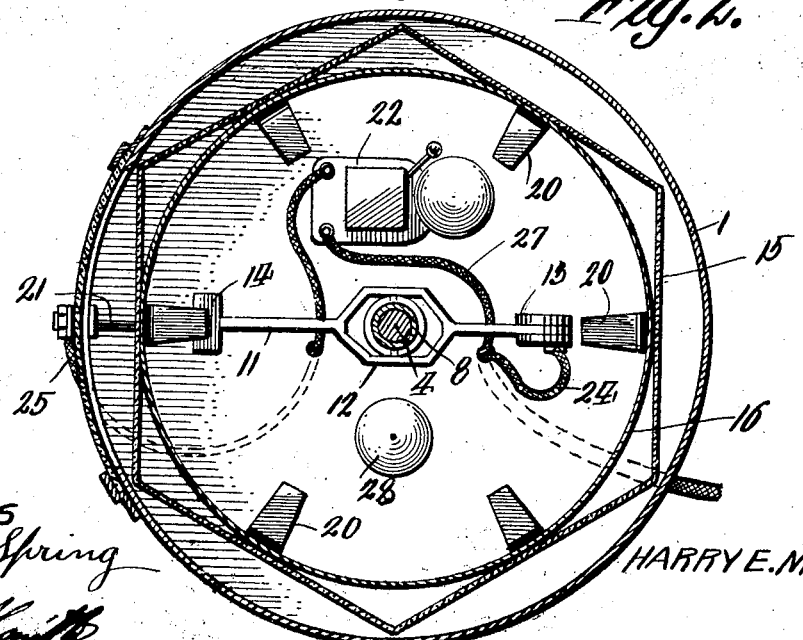
WITNESSES
Guy M Spring
Chas F Smith
Inventor
HARRY E. MASON
By Richard B Owen
Attorney May 12, 1925.　　　　　　　H. E. MASON　　　　　　　1,537,364
SPEED SIGNAL
Filed April 24, 1922　　2 Sheets-Sheet 2
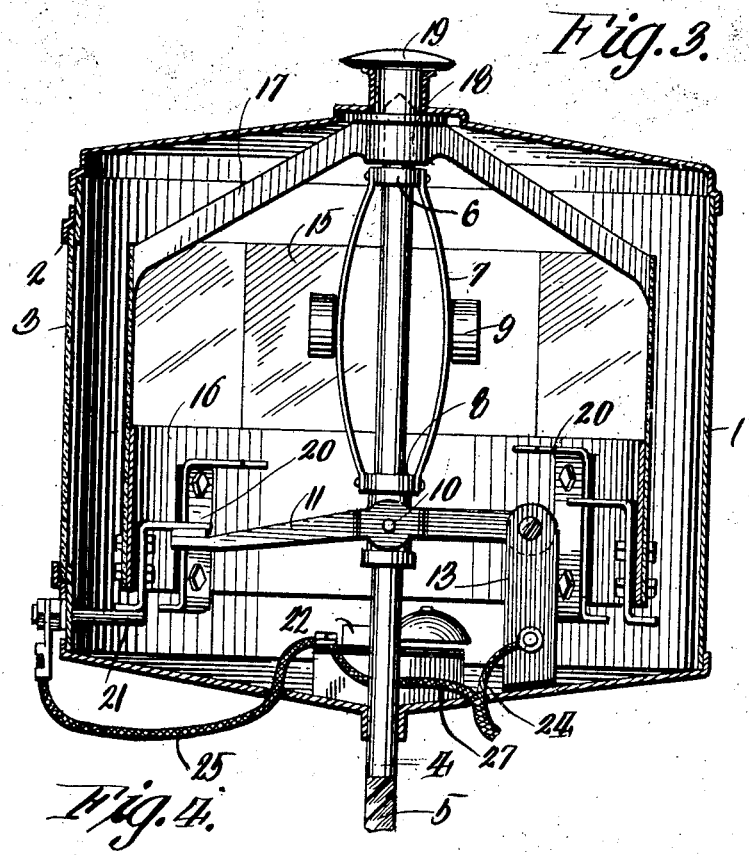
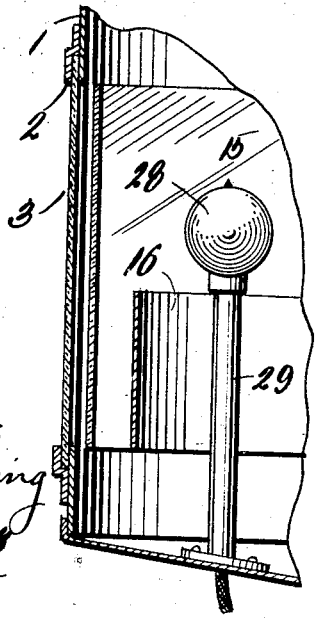
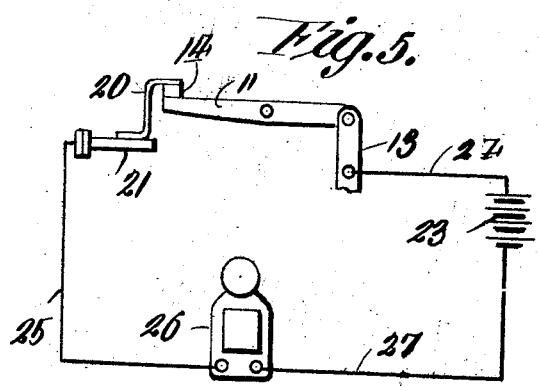
WITNESSES
Inventor
HARRY E. MASON
By Richard B. Owen
Attorney Patented May 12, 1925.

1,537,364

UNITED STATES PATENT OFFICE.

HARRY E. MASON, OF COVINGTON, KENTUCKY.

SPEED SIGNAL.

Application filed April 24, 1922. Serial No. 556,226.

*To all whom it may concern:*

Be it known that I, HARRY E. MASON, a citizen of the United States, residing at Covington, in the county of Kenton and State of Kentucky, have invented certain new and useful Improvements in a Speed Signal, of which the following is a specification.

The present invention relates to a speed signal adapted to be used particularly with automobiles and has for its principal object to provide means for indicating to the driver of a vehicle when he is exceeding the speed limit of the place through which he is driving.

Another very important object of the invention is to provide a device of this nature which is adjustable so as to signal when the vehicle is being driven at a desired speed.

A further object of the invention is to provide a device of this nature which will be simple and efficient in construction, reliable in operation, inexpensive to manufacture, and well adapted to the purpose for which it is designed.

With the above and numerous other objects in view as will appear as the description progresses, the invention resides in certain novel features of construction, and the combination and arrangement of parts as will be hereinafter more fully described and claimed.

In the drawing:—

Figure 1 is an elevation of the speed signal embodying my invention,

Figure 2 is a horizontal section therethrough,

Figure 3 is a vertical section therethrough,

Figure 4 is a fragmentary vertical section therethrough, and

Figure 5 is a diagram showing the electric circuit used with the device.

Referring to the drawing in detail it will be seen that the casing 1 is here shown as circular in formation and is provided with a rectangular opening 2 which is preferably closed by a transparent panel 3 which is held in place in any suitable manner. The main shaft 4 is journalled vertically in the casing 1 and centrally thereof and may be driven in any preferred manner such as by a flexible cable 5 connected to suitable gearing so as to be driven by one of the wheels of an automobile. A governor mechanism is mounted on the shaft 4 and in the present instance consists of a collar 6 fixed to the shaft 4 adjacent its upper end. A plurality of leaf springs 7 are fixed to the fixed collar 6. A slidable collar 8 is mounted on the shaft 4 and has attached thereto the other ends of the leaf springs 7. The weights 9 are fixed to the leaf springs 7 intermediate their ends. It will therefore be seen that when the shaft 4 is rotated the weights 9 will be forced outwardly so as to cause the springs 7 to bow thereby lifting upwardly on the collar 8. This collar 8 is provided with an annular groove (not shown) for receiving the pins 10 mounted intermediate the lever 11 which is formed so as to embrace the shaft and collar 8 as at 12. This lever 11 is fulcrumed in the standard 13 at one end and is provided with a contact 14 at its free end. A rotatable contact supporting member is mounted in the casing and in the present instance is substantially hexagonal in formation being provided with a plurality of transparent panels 15 suitably fixed to the cylindrical member 16. The parts 15 and 16 are supported on the arms 17 which radiate from the sleeve 18 and depend therefrom slightly. The upper end of the shaft 4 is journalled in the sleeve 18. This sleeve terminates exteriorly of the casing in a knob 19. This knob may be rotated for the purpose of placing the panels 15 in registry with the panel 3. As is indicated to advantage in Figure 1 these panels 15 are provided with suitable indicia indicating the speed limit of various cities and the like. Thus in the drawing the speed limit of Detroit we will presume, is fifteen miles per hour and one panel 15 will have this information written thereon so that when said panel is in registry with the panel 3 the device will signal when the vehicle reaches the speed of fifteen miles per hour.

A plurality of contact members 20 of varying lengths are disposed about the cylindrical member 16 one adjacent each of the panels 15. These contact members are adapted to be engaged at their bottom ends with a rod 21 and their upper ends are adapted to be engaged by the contact on the lever 11. The contact 20 beneath the registering panel 15 will be so positioned as to be engaged by the lever 11. When the contact 14 of the lever 11 is in engagement with one of the contacts 20 the electric bell 22 will be sounding. By referring to Figure 5 particularly, it will be seen that a source of electrical energy 23 is provided and that the current passes through the wire 24, standard 13, lever 11, contact 14, contact 20, rod 21, wire 25, audible signal 26, and returned through wire 27. Any suitable source of illumination is provided within the panels 15 so that the indicia thereon may be readily read through panel 3 and in the present illustration this source of illumination consists of an electric bulb 28 mounted on the standard 29 suitably attached to the bottom of the casing 1.

It is thought that the operation of the invention will now be readily understood without a more detailed description. It is to be understood, however, that the present illustration of the invention is merely given by way of example and that numerous changes in form, material, and in the combination and arrangement of parts may be resorted to without departing from the spirit of the invention as hereinafter claimed.

Having thus described my invention what I claim as new is:—

1. In combination, a casing, a rotatable member mounted in said casing, a plurality of spaced contacts of varying lengths on said rotary member, a lever pivoted in said casing, a circuit including said lever, said rotatable member adapted to be rotated so as to place one of said contacts in said circuit by being disposed in the path of movement of said lever, a signal in said circuit, and a governor mechanism for controlling said lever with respect to the contact which may be disposed in the path of movement of the lever so as to close the circuit in the manner and for the purpose specified.

2. In combination, a rotatably mounted shaft, a casing, said shaft being journaled in said casing, a rotatable member disposed within the casing about the shaft, means for rotating the rotatable member exteriorly of the casing, a governor mechanism within the rotatable member controlled by the shaft, a lever within the casing, means connecting the lever with the governor mechanism so that it may be controlled by the governor mechanism, and a plurality of spaced independent contacts arranged on the rotatable member and of varying lengths, whereby the rotatable member may be moved to swing any one of the said contacts into the path of the movement of the lever for the purpose of closing a circuit all in the manner and for the purpose specified.

3. In combination, a casing, a rotatable member mounted in said casing, a plurality of spaced contacts of varying length on said rotatable member, a lever pivoted in said casing, a contact rod disposed in the casing and engageable by the contacts, a conductor having one end connected to said lever and the other end connected to the rod, so that when one of said contacts is engaged with the contact rod it is also in the path of the movement of the lever for forming a closed circuit all in the manner and for the purpose specified.

In testimony whereof I affix my signature in presence of two witnesses.

HARRY E. MASON.

Witnesses:
MARY R. MARTIN,
LUCILE HALL.